(12) United States Patent
Lemasters

(10) Patent No.: US 6,545,789 B1
(45) Date of Patent: Apr. 8, 2003

(54) DEVICE TO IMPROVE Z-AXIS RESOLUTION IN CONFOCAL MICROSCOPY

(76) Inventor: John J. Lemasters, 106 Priestly Creek Dr., Chapel Hill, NC (US) 27599

( * ) Notice: Subject to any disclaimer, the term of this patent is extended or adjusted under 35 U.S.C. 154(b) by 514 days.

(21) Appl. No.: 09/065,997

(22) Filed: Apr. 24, 1998

Related U.S. Application Data

(60) Provisional application No. 60/044,871, filed on Apr. 25, 1997.

(51) Int. Cl.[7] .............................................. G02B 26/02
(52) U.S. Cl. ....................................... 359/227; 359/368
(58) Field of Search ................................. 359/232, 234, 359/235, 363, 368, 369, 227

(56) References Cited

U.S. PATENT DOCUMENTS 4,902,115 A * 2/1990 Takahashi .................... 359/362
4,927,254 A * 5/1990 Kino et al. .................... 359/368
5,579,157 A * 11/1996 Tanaami et al. .............. 359/368

* cited by examiner

Primary Examiner—M Robinson
(74) Attorney, Agent, or Firm—Myers Bigel Sibley & Sajovec

(57) ABSTRACT

Disclosed are devices to improve the z-axis of confocal microscopes. The devices consists of opaque baffles placed in front of and behind the detection apertures of the microscope systems. By converting the baffles and detection apertures into light sensitive surfaces in an axial array, images from multiple planes of focus can be collected simultaneously with improved z-axis resolution. Several configurations for baffles and axial arrays are also disclosed for use with micro scopes employing pinhole detection and slit detection.

3 Claims, 3 Drawing Sheets

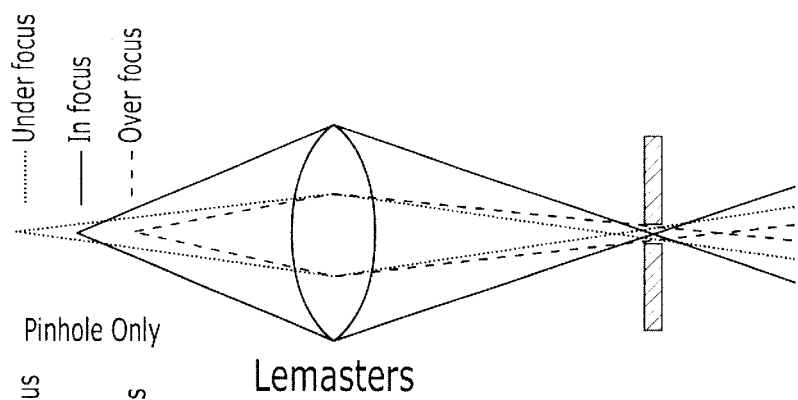
FIGURE 2A — Pinhole Only / Lemasters
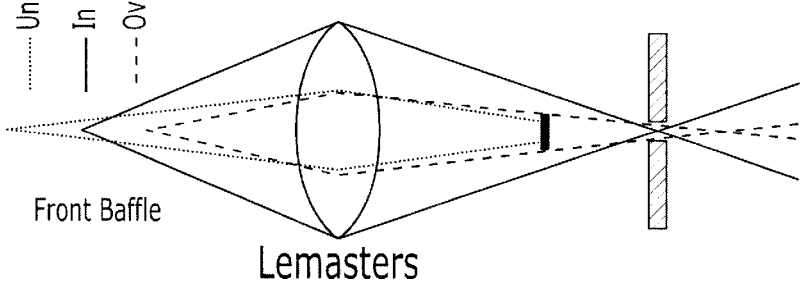
FIGURE 2B — Front Baffle / Lemasters
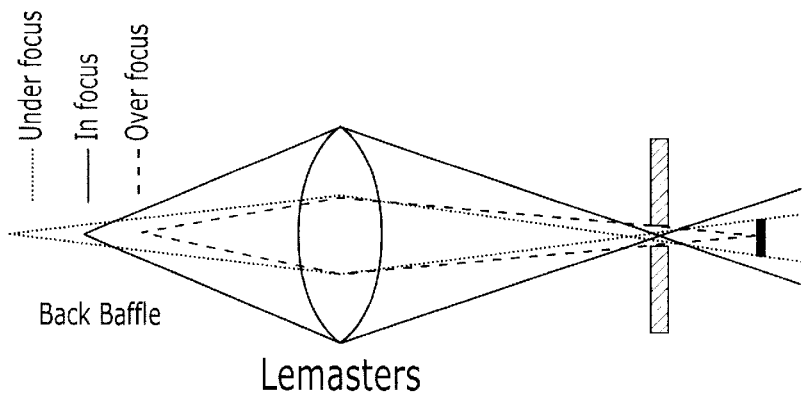
FIGURE 2C — Back Baffle / Lemasters
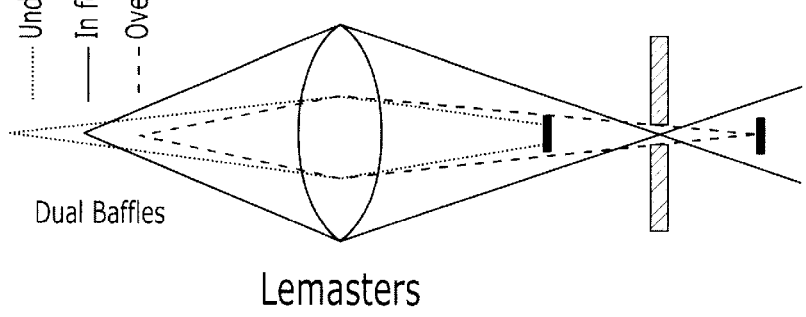
FIGURE 2D — Dual Baffles / Lemasters

DEVICE TO IMPROVE Z-AXIS RESOLUTION IN CONFOCAL MICROSCOPY

This application claims the benefit of Provisional application No. 60/044,871, filed Mar. 25, 1997.

FIELD OF THE INVENTION

This invention relates to confocal microscopy in general, and particularly relates to the design of pinhole and slit detection aperture assemblies used in confocal microscopy.

BACKGROUND OF THE INVENTION

Conventional wide field light microscopes create images whose effective depth of field at high coder is 2–3 $\mu$m. Since the resolving power of optical microscopy is about 0.2 $\mu$m, superimposition of detail within this plane of focus obscures structural detail that would otherwise be resolved. In addition, for specimens thicker than this depth of field, light from out-of-focus planes creates diffuse halos around objects under study. These halos are especially prominent in fluorescence microscopy. Confocal microscopy eliminates these undesirable artifacts by generating thin sub micron optical slices through thick specimens (M. Minsky, U.S. Pat. No. 3,013,467; M. Petran et al., *J Opt. Soc. Am.* 58, 661–664 (1968); J. White et al., *J Cell Biol.* 105, 41 (1987); T. Wilson, *Confocal Microscopy* (Academic Press, London 1990)). Confocal sections minimize superimposition of detail and exclude light from out-of-focus planes. As a consequence, images or remarkable detail and resolution are generated. Recently, ultraviolet-visible laser scanning confocal microscopes have become commercially available that expand the range of confocal applications to include UV-excited fluorophores. Increasingly, confocal microscopy has become an essential analytical tool in biology, medicine, materials science and microelectronics.

A confocal microscope scans a focused spot of light across the specimen (FIG. 1). Spot diameter is diffraction limited, or about 0.2 $\mu$m for a high numerical aperture objective lens. Light fluoresced or reflected from the specimen is separated from the illuminating beam of light by a mirror or dichroic reflector and is focused by the objective lens onto a pinhole aperture. Light from above and below the focal plane misses the pinhole opening and strikes the wall of the aperture instead (FIG. 1). Thus, only light from a narrow in-focus plane passes through the pinhole to strike a photodetector beyond. In this way, the photodetector "sees" light from only a very narrow plane of focus.

Two dimensional images are generated as the illuminating spot of light moves across the specimen. Such scanning is achieved using vibrating mirrors, acousto-optical modulators, or a rotating disk containing multiple pinholes in a spiral arrangement (Nipkow disk). Reflected and fluoresced light passes back through the scan generator, a process that "descans" the returning light so that it can be focused on a detection pinhole and transmitted to a photomultiplier. In laser scanning confocal microscopy, the instantaneous response of the is photomultiplier is then displayed on the synchronously scanned phosphor screen of a cathode ray tube monitor to recreate the image. Using a Nipkow disk in what is called tandem-scanning confocal microscopy, confocal images are viewed directly and recorded by photographic film (Petran et al., 1968). In certain configurations, a slit detection aperture replaces the pinhole detection aperture with only modest loss of Z-axis resolving power. In laser scanning confocal microscopy, images are typically stored in commuter memory for later analysis (white et al., 1987).

Confocal microscopes produce optical slices of defined thickness through thick specimens. For a high numerical aperture lens, thickness of the confocal sections can reach a theoretical limit of about 0.5 $\mu$m. The thickness or confocal sections decreases as the detector pinhole is made smaller. Since not all applications require the thinnest possible confocal section, sensitivity can be increased by opening the pinhole aperture. Doubling the diameter of the pinhole quadruples sensitivity, but only about doubles the thickness of the optical slice. For this reason, most laser scanning confocal microscopes are equipped with variable pinhole apertures. For light sensitive specimens, a larger pinhole setting may be desirable so that laser power can be attenuated to an acceptable level. Conversely, pinhole diameter can be decreased to reduce slice thickness and increase resolution in the z-axis. However, below a minimum pinhole size, confocal slice thickness no longer decreases as pinhole diameter decreases, although image intensity continues to decline. Thus, overly small pinhole diameters should be avoided, especially with light sensitive specimens.

Although confocal microscopes achieve a Z-axis resolution approaching 0.5 $\mu$m, this is not the diffraction limit of optical resolution for a high resolution microscope system, which is about 0.2 $\mu$m An object of the present invention is to modify the detection aperture assembly to improve Z-axis resolution beyond that achievable by current technology.

DESCRIPTION OF THE DRAWINGS

FIG. 2A shows a confocal microscope assembly without the use of baffles;

FIG. 2B shows a confocal microscope assembly with a front baffle;

FIG. 2C shows a confocal microscope assembly with a back baffle;

FIG. 2D shows a confocal microscope assembly with both front and back baffles.

DESCRIPTION OF THE INVENTION

Figure 1:
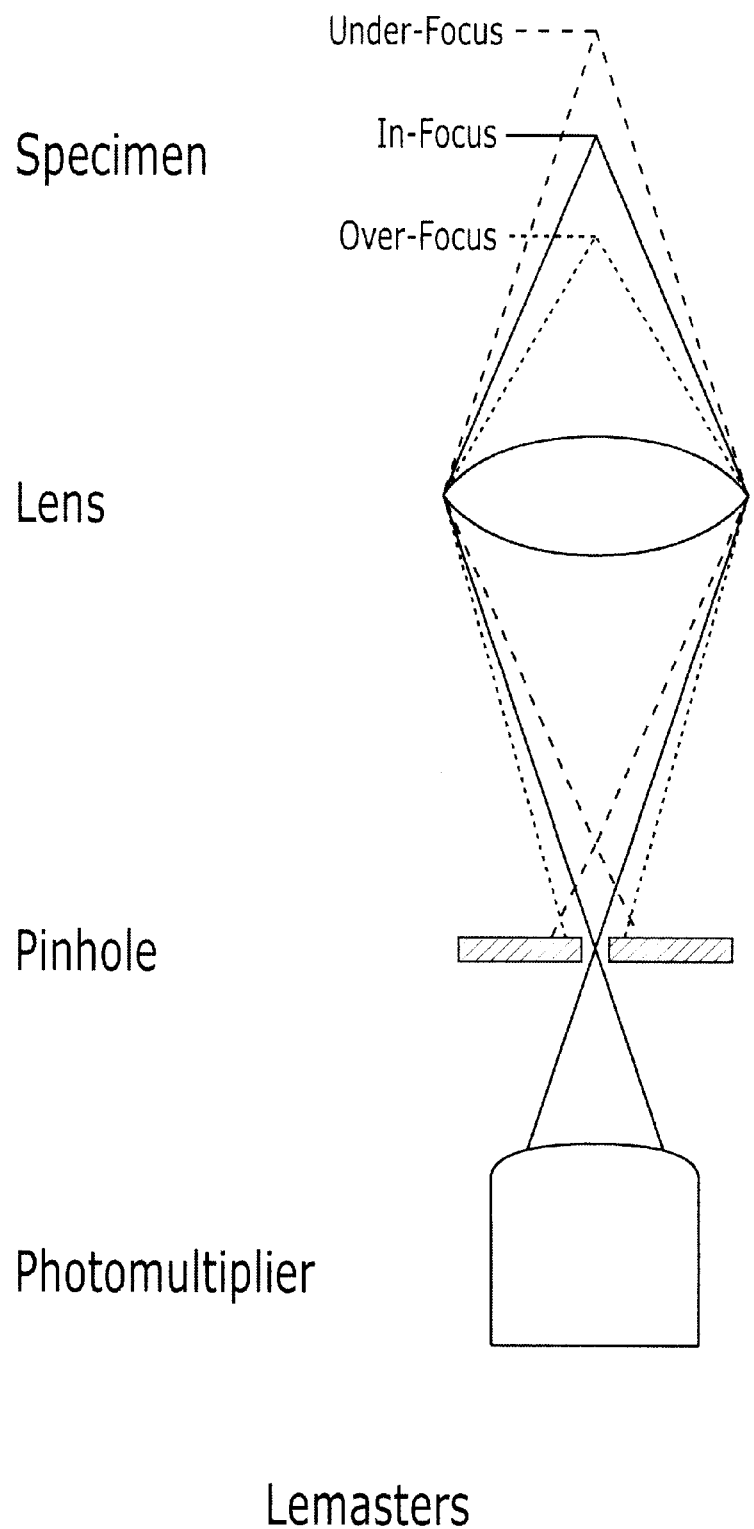
FIG. 1 shows a prior art confocal microscope assembly.

In confocal microscopy, the microscope objective focuses light from the in-focus specimen plane onto the opening of a pinhole aperture (FIG. 1). This in-focus light passes through the aperture to strike a light detector beyond. The selective transmission of in-focus light relative to out-of-focus is the means by which a thin optical section of the, specimen is created as the specimen is scanned with a collimated beam of light.

From optical theory, the confocal effect is greater the higher the numerical aperture of the objective lens, an effect well documented in practice. In the optics of confocal imaging microscopes, each in-focus point in the specimen generates an Airy disk in the image plane of the detector aperture. Typically, the resulting Airy disk is approximately 50 $\mu$m in diameter, and an aperture of this size in an adjustable diaphragm permits this light to strike the photomultiplier. Light from out-of-focus planes is focused to Airy disks above and below the aperture. Consequently, most out-of-focus light strikes the wall of the aperture and is not detected by the photomultiplier (FIG. 1).

A shown in FIG. 2A, some light originating from above and below the image plane passes the pinhole and reaches the light detector. This light diminishes contrast, sharpness and z-axis resolution. Because of this effect, z-axis resolution is limited to about 0.5 μm, whereas lateral (x-y) resolution is 0.2 μm with a high numerical aperture objective lens. For any applications in cell and molecular biology, as well as other fields, it is desirable to have z-axis resolution that matches lateral resolution for imaging chromosomes, protein synthesis, subcellular organelles, etc.

As illustrated FIGS. 2B and C, the placement of an opaque circular baffle in front of or behind the pinhole rejects residual light arising from out-of-focus planes. Depending on baffle placement, 75% or more of in-focus light still traverses the pinhole to the light detector beyond. Thus, use of a baffle results in a thinner confocal section To block out-of-focus light even more efficiently, baffles may be placed both in front of and behind the pinhole aperture, as illustrated in FIG. 2D. Symmetrically placed front and back baffles block out-of-focus light more completely but do not reduce passage of in-focus light compared to a single baffle. Thus, a dual baffle design provides the more improvement z-axis resolution.

If the detection aperture is a slit, then opaque rectangular bands or ribbons placed in front of and/or behind the slit aperture can serve as baffles to improve Z-axis resolution.

The optimal size and placement of baffles will depend on many factors, including the numerical aperture of the objective lens, the wavelength of light and the brightness of the specimen. To adjust the baffles to meet changing needs, baffles should have an adjustable diameter (or width or a ribbon baffle) and should be movable in the x, y and z planes for alignment.

Figure 3:
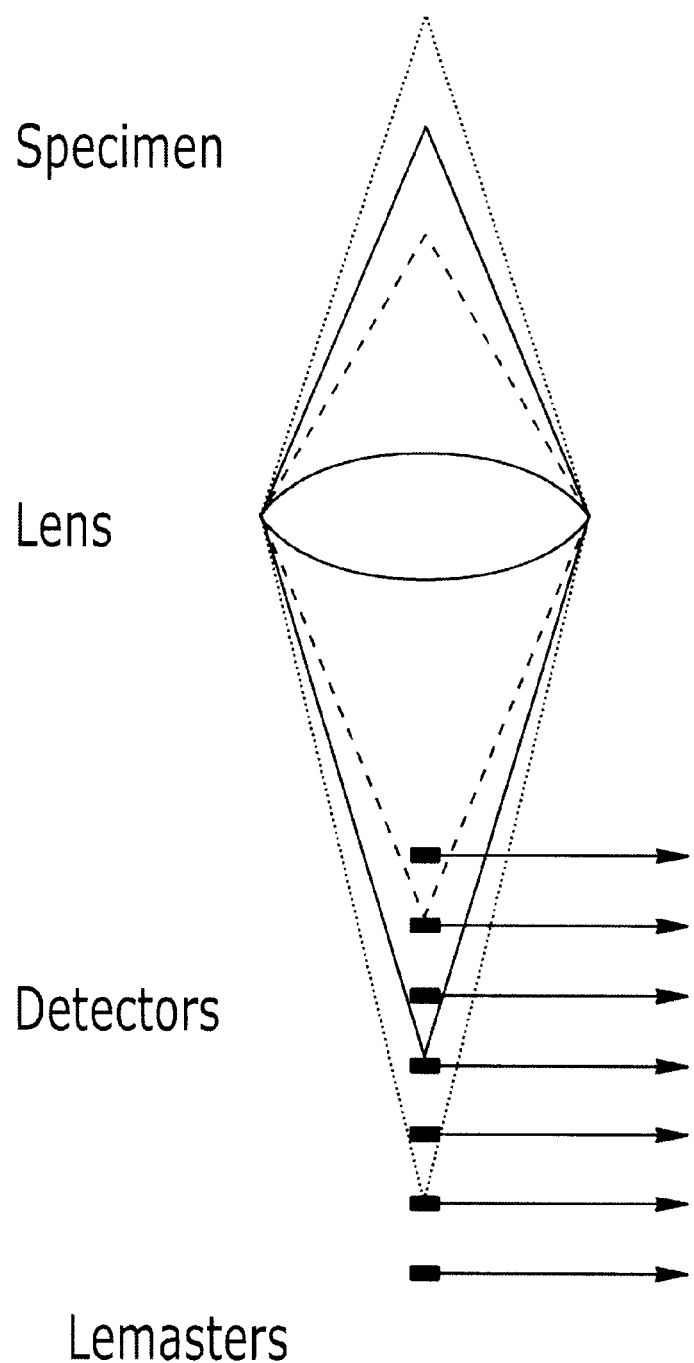
FIG. 3 shows a confocal microscope assembly with an axial array of light detectors.

The baffle and aperture assembly may also be replaced with an axial array of light-detectors, as illustrated in FIG. 3. With an axial detector array, each circular detector surface captures light from a single plane of focus. Each detector converts light energy to voltage or current that is transmitted to the appropriate circuitry via wire leads or other connection. Other detectors in the axial array collect light from other planes of focus. Each detector prevents out-of-focus light from reaching the other detectors in the array. In this configuration, images from several planes of focus can be simultaneously detected during a single scan.

The foregoing examples are illustrative of the present invention, and are not taken as limiting thereof. The invention is defined by the following claims, with equivalents thereof to be included therein.

That what is claimed is:

1. A confocal microscope comprising a detecting pinhole and an opaque circular baffle placed in front of said detecting pinhole to block out-of-focus light and improve z-axis resolution.

2. A confocal microscope comprising a detecting pinhole and opaque circular baffles placed in a location selected from the group consisting of (a) in front of, (b) behind, and (c) both in front of and behind said detecting pinhole to block out-of-focus light and improve z-axis resolution, wherein the diameter of said baffles is adjustable.

3. A confocal microscope comprising a detecting pinhole and opaque circular baffles placed in a location selected from the group consisting of (a) in front of, (b)behind, and (c) both in front and behind said detecting pinhole to block out-of-focus light and improve z-axis resolution, wherein the diameter of said baffles is adjustable and wherein the position of said baffles relative to the pinhole is adjustable in all dimensions for alignment.

* * * * *